(12) United States Patent
Kalamatianos et al.

(10) Patent No.: US 11,868,777 B2
(45) Date of Patent: Jan. 9, 2024

(54) PROCESSOR-GUIDED EXECUTION OF OFFLOADED INSTRUCTIONS USING FIXED FUNCTION OPERATIONS

(71) Applicant: ADVANCED MICRO DEVICES, INC., Santa Clara, CA (US)

(72) Inventors: John Kalamatianos, Boxborough, MA (US); Michael T. Clark, Austin, TX (US); Marius Evers, Santa Clara, CA (US); William L. Walker, Fort Collins, CO (US); Paul Moyer, Fort Collins, CO (US); Jay Fleischman, Fort Collins, CO (US); Jagadish B. Kotra, Austin, TX (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 17/123,270

(22) Filed: Dec. 16, 2020

(65) Prior Publication Data

US 2022/0188117 A1 Jun. 16, 2022

(51) Int. Cl.
*G06F 9/30* (2018.01)
*G06F 9/38* (2018.01)
*G06F 9/52* (2006.01)

(52) U.S. Cl.
CPC ...... *G06F 9/30181* (2013.01); *G06F 9/30043* (2013.01); *G06F 9/30098* (2013.01); *G06F 9/30138* (2013.01); *G06F 9/3834* (2013.01); *G06F 9/3877* (2013.01); *G06F 9/52* (2013.01)

(58) Field of Classification Search
CPC .. G06F 9/3877; G06F 9/30043; G06F 9/3098; G06F 9/30098; G06F 9/30138; G06F 9/3834
See application file for complete search history.

(56) References Cited

U.S. PATENT DOCUMENTS

| | | | |
|---|---|---|---|
| 5,903,916 A | 5/1999 | Pawlowski et al. | |
| 6,553,465 B1 | 4/2003 | Takusagawa | |
| 6,944,746 B2 * | 9/2005 | So .................... | G06F 9/3861 |
| | | | 375/E7.027 |

(Continued)

FOREIGN PATENT DOCUMENTS

| | | |
|---|---|---|
| WO | 2014120193 A1 | 8/2014 |
| WO | 2022146793 A1 | 7/2022 |

OTHER PUBLICATIONS

Aga et al., "Co-ML: A Case for Collaborative ML Acceleration using Near-Data Processing", MemSys, Oct. 2019, 12 pages, ACM New York.

(Continued)

*Primary Examiner* — Jacob Petranek

(57) ABSTRACT

Processor-guided execution of offloaded instructions using fixed function operations is disclosed. Instructions designated for remote execution by a target device are received by a processor. Each instruction includes, as an operand, a target register in the target device. The target register may be an architected virtual register. For each of the plurality of instructions, the processor transmits an offload request in the order that the instructions are received. The offload request includes the instruction designated for remote execution. The target device may be, for example, a processing-in-memory device or an accelerator coupled to a memory.

20 Claims, 7 Drawing Sheets

(56) References Cited

U.S. PATENT DOCUMENTS

| | | | |
|---|---|---|---|
| 7,047,393 B2* | 5/2006 | Paver | G06F 9/30014 712/225 |
| 8,359,462 B1* | 1/2013 | Khan | G06F 9/381 712/241 |
| 11,625,249 B2 | 4/2023 | Kotra et al. | |
| 2005/0015538 A1 | 1/2005 | Van't Wout et al. | |
| 2005/0246698 A1 | 11/2005 | Chung | |
| 2008/0046692 A1* | 2/2008 | Michalak | G06F 9/3877 712/214 |
| 2017/0060588 A1* | 3/2017 | Choi | G06F 9/3881 |
| 2018/0089081 A1 | 3/2018 | Ramalingam | |
| 2018/0188961 A1 | 7/2018 | Venkatesh et al. | |
| 2018/0336035 A1 | 11/2018 | Choi et al. | |
| 2019/0138313 A1 | 5/2019 | Lin | |
| 2019/0377580 A1 | 12/2019 | Vorbach et al. | |
| 2020/0035291 A1 | 1/2020 | Kasibhatla et al. | |
| 2020/0174931 A1 | 6/2020 | Williams et al. | |
| 2020/0218540 A1* | 7/2020 | Kesiraju | G06F 9/3877 |
| 2022/0188233 A1 | 6/2022 | Kalamatianos et al. | |
| 2022/0206817 A1 | 6/2022 | Kotra et al. | |
| 2022/0206855 A1 | 6/2022 | Challapalle et al. | |

OTHER PUBLICATIONS

Ahn et al., "PIM-Enabled Instructions: A Low-Overhead, Locality-Aware Processing-in-Memory Architecture", 2015 ACM/IEEE 42nd Annual International Symposium on Computer Architecture (ISCA), Jun. 2015, 13 pages, IEEE, United States.

Denby et al., "Orbital Edge Computing: Nanosatellite Constellations as a New Class of Computer System", Proceedings of the Twenty-Fifth International Conference on Architectural Support for Programming Languages and Operating Systems (ASPLOS '20), Mar. 2020, pp. 939-954, IEEE, United States, URL: https://doi.org/10.1145/3373376.3378473.

Gao et al., "ComputeDRAM: In-Memory Compute Using Off-the-Shelf DRAMs", Proceedings of the 52nd Annual EEE/ACM International Symposium on Microarchitecture (MICRO '52), Oct. 2019, pp. 100-113, IEEE, URL: https://doi.org/10.1145/3352460.3358260.

Ghose et al., "A Workload and Programming Ease Driven Perspective of Processing-in-Memory", IBM Journal of Research & Development, vol. 63, Issue: 6, Nov. 2019, IBM, United States.

Ghose et al., "Enabling the Adoption of Processing-in-Memory: Challenges, Mechanisms", Future Research Directions, Carnegie Mellon University Invited Book Chapter, 45 pages, Feb. 2018, Cornell University (online: arXiv.org), URL: https://arxiv.org/pdf/1802.00320.pdf.

Islam et al., "Improving Node-Level MapReduce Performance Using Processing-in-Memory Technologies", European Conference on Parallel Processing (Euro-Par 2014: Parallel Processing Workshops), pp. 425-437, Springer International Publishing, Switzerland.

Loh et al., "A Processing-in-Memory Taxonomy and a Case for Studying Fixed-function PIM", 3rd Workshop on Near-Data Processing, Dec. 2013, 4 pages, University of Utah.

Mutlu et al., "Enabling Practical Processing in and near Memory for Data-Intensive Computing", Proceedings of the 56th Annual Design Automation Conference (DAC '19), Jun. 2019, Article No. 21 pp. 1-4, https://doi.org/10.1145/3316781.3323476.

Mutlu et al., "Processing Data Where It Makes Sense: Enabling In-Memory Computation", Journal of Microprocessors and Microsystems, vol. 67, Jun. 2019, pp. 28-41, Elsevier B.V., Amsterdam, The Netherlands.

Nyasulu, "System Design for a Computational-RAM Login-In-Memory Parallel Processing Machine", PhD Thesis, May 1999, 196 pages, Carleton University, Ottawa, ON, Canada.

Pugsley et al., "Analyzing the Impact of 3D-stacked Memory+Logic Devices on MapReduce Workloads", 2014 IEEE International Symposium on Performance Analysis of Systems and Software (ISPASS), Marcy 2014, pp. 190-200, IEEE, United States.

Singh et al., "A Review of Near-Memory Computing Architectures: Opportunities and Challenges", EuroMicro Conference on DSD, Aug. 2018, 10 pages, IEEE, United States, Doi: 10.1109/DSD.2018.00106.

Yang et al., "A Processing-in-Memory Architecture Programming Paradigm for Wireless Internet-of-Things", Applications, Sensors Journal, Jan. 2019, 23 pages, MDPI, Basel, Switzerland.

Boroumand et al., "LazyPIM: Efficient Support for Cache Coherence in Processing-in-Memory Architectures", IEEE Computer Architecture Letters, vol. 16, Issue 1, DOI:10.1109/LCA.2016.2577557, dated Jun. 2016, 12 pages.

Farmahini-Farahani et al., "NDA: Near-DRAM Acceleration Architecture Leveraging Commodity DRAM Devices and Standard Memory Modules", 2015 IEEE 21st International Symposium on High Performance Computer Architecture (HPCA), DOI: 10.1109/HPCA.2015.7056040, dated Mar. 2015, 13 pages.

IBM Corporation, "dcbf (Data Cache Block Flush) instruction", IBM Documentation, URL: https://www.ibm.com/docs/en/aix/7.2?topic=set-dcbf-data-cache-block-flush-instruction, 2020, printed May 4, 2021, 3 pages.

IBM Corporation, dcbi (Data Cache Block Invalidate) instruction, IBM Documentation, URL: https://www.ibm.com/docs/en/aix/7.2?topic=set-dcbi-data-cache-block-invalidate-instruction, 2020, printed May 4, 2021, 3 pages.

Seshadri et al., "RowClone: Fast and Energy-Efficient In-DRAM Bulk Data Copy and Initialization", 2013 46th Annual IEEE/ACM International Symposium on Microarchitecture (MICRO), DOI:10.1145/2540708.2540725, dated Dec. 2013, 13 pages.

Andi Kleen (andi@firstfloor.org), Memory Offlining, /sys/devices/system/memory/hard_offline_page, URL: https://www.kernel.org/doc/Documentation/ABI/testing/sysfs-memory-page-offline, dated Sep. 2009, 1 page.

International Search Report and Written Opinion, PCT/US2021/064663, dated May 10, 2022, 12 pages.

Jonathan Corbet, AutoNUMA: the other approach to NUMA scheduling, URL: https://lwn.net/Articles/488709/, dated Mar. 27, 2012, 5 pages.

Kwon et al., 25.4 A 20nm 6GB Function-In-Memory DRAM, Based on HBM2 with a 1.2TFLOPS Programmable Computing Unit Using Bank-Level Parallelism, for Machine Learning Applications, IEEE, 2021 IEEE International Solid-State Circuits Conference (ISSCC),URL: https://safari.ethz.ch/architecture_seminar/fall2021/lib/exe/fetch.php?media=kwon2021fimdram.pdf, DOI: 10.1109/ISSCC42613.2021.9365862, Date Added to IEEE Xplore: Mar. 3, 2021, 3 pages.

Nam Sung Kim, A Journey to a Commercial-Grade Processing-In-Memory (PIM) Chip Development, HPCA 2021, The 27th IEEE International Symposium on High-Performance Computer Architecture (PCA-27), Seoul, South Korea, URL: https://hpca-conf.org/2021/keynotes/, dated Mar. 3, 2021, 3 pages.

International Search Report and Written Opinion, PCT/US2021/063345, dated Apr. 4, 2022, 9 pages.

Kim, "A Journey to a Commercial-Grade Processing-In-Memory (PIM) Chip Development", The 27th IEEE International Symposium on High-Performance Computer Architecture (HPCA-27), Mar. 2021, Samsung, Seoul, South Korea, URL: https://hpca-conf.org/2021/keynotes/, 3 pages (abstract only, specifically pp. 2-3).

International Search Report and Written Opinion, PCT/US2022/052886, dated Mar. 20, 2023, 11 pages.

Santos et al., "Processing in 3D memories to speed up operations on complex data structures," 2018 Design, Automation & Test in Europe Conference & Exhibition (DATE), Date of Conference: Mar. 19-23, 2018, Dresden, Germany, DOI: 10.23919/DATE.2018.8342135, Date Added to IEEE Xplore: Apr. 23, 2018, 4 pages.

* cited by examiner

PROCESSOR-GUIDED EXECUTION OF OFFLOADED INSTRUCTIONS USING FIXED FUNCTION OPERATIONS

BACKGROUND

Computing systems often include a number of processing resources (e.g., one or more processors), which may retrieve and execute instructions and store the results of the executed instructions to a suitable location. A processing resource (e.g., central processing unit (CPU)) can comprise a number of functional units such as arithmetic logic unit (ALU) circuitry, floating point unit (FPU) circuitry, and/or a combinatorial logic block, for example, which can be used to execute instructions by performing logical operations on data (e.g., one or more operands). For example, functional unit circuitry may be used to perform arithmetic operations such as addition, subtraction, multiplication, and/or division on operands via a number of logical operations. Typically, the processing resources (e.g., processor and/or associated functional unit circuitry) may be external to a memory array, and data is accessed via a bus between the processing resources and the memory array to execute a set of instructions. To reduce the amount of accesses to fetch or store data in the memory array, computing systems may employ a cache hierarchy that temporarily stores recently accessed or modified data for use by a processing resource or a group of processing resources. However, processing performance may be further improved by offloading certain operations to a processor-in-memory (PIM) device, in which processing resources may be implemented internal and/or near to a memory, such that data processing is performed closer to the memory location storing the data rather than bringing the data closer to the processing resource. A PIM device may save time by reducing and/or eliminating external communications and may also conserve power.

Certain applications have phases of low or no temporal data reuse during which they frequently miss in the cache hierarchy and fetch data from memory. In addition, these phases may also exhibit low computational intensity (ratio of flops/byte). During those phases, energy efficiency and performance drops because data movement is high and the phase is memory bound. Accordingly, these phases are particularly suited for offloading to a PIM device or accelerator. For example, the programmer can provide indications in the application source code that a particular code sequence should be offloaded, or the compiler may make such a determination. The interpretation and orchestration of offloaded instructions must still be performed by the processing resource(s) hosting the application.

DETAILED DESCRIPTION

Figure 1:
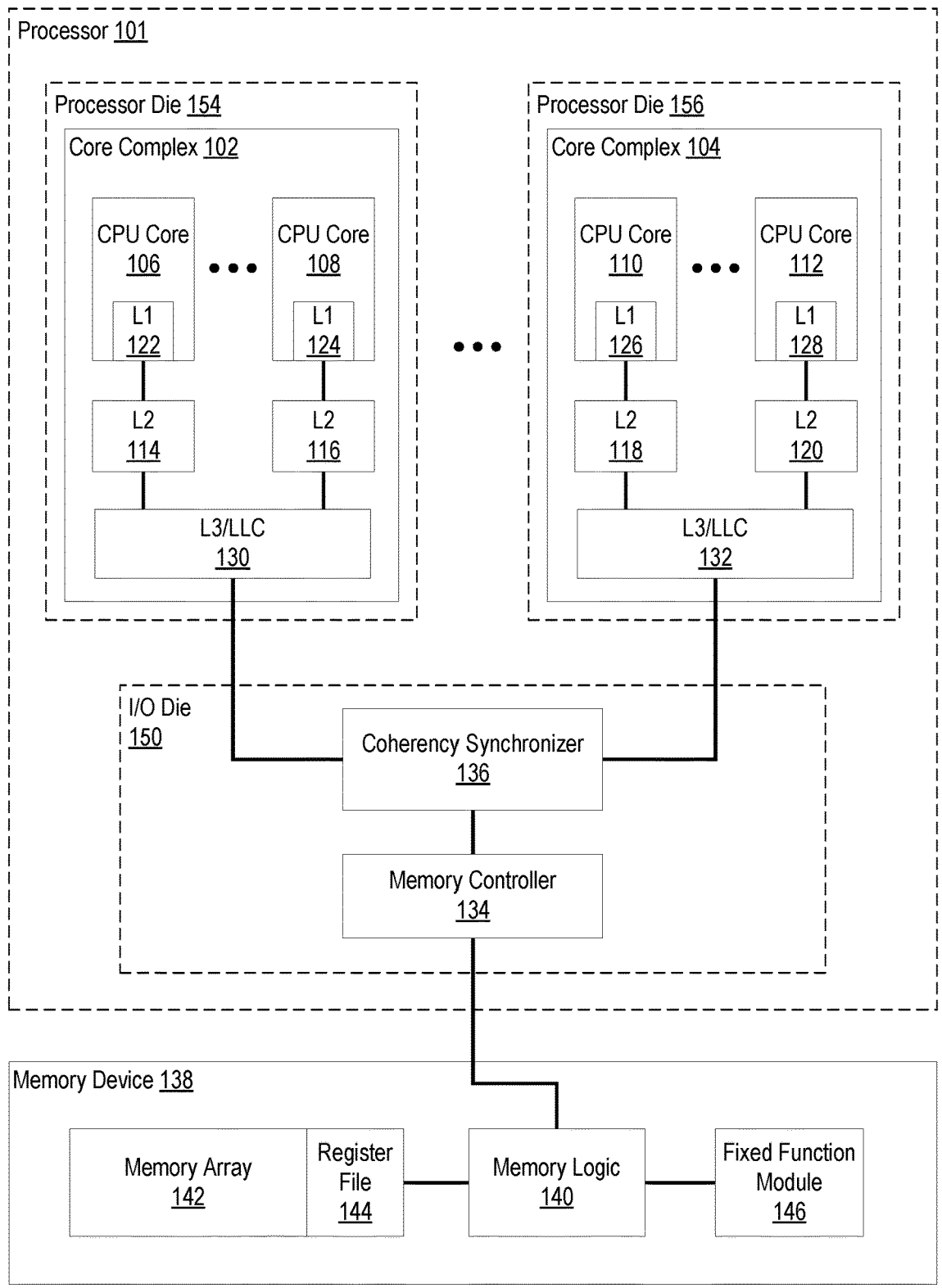
FIG. 1 sets forth a block diagram of an example system for processor-guided execution of offloaded instructions using fixed function operations according to embodiments of the present disclosure.

Processing-in-Memory (PIM) architectures support offloading instructions for execution in or near memory, such that bandwidth on the data link between the processor and the memory is conserved and power consumption of the processor may be reduced. Execution of offloaded instructions by, for example, a PIM device do not require loading data into local CPU registers and writing data from local CPU storage back to the memory.

Some examples of a PIM architectures consider programmable hardware available in the form of in-order, out-of-order CPU cores, programmable address generation engines, GPUs, custom accelerators, etc., with PIM hardware located either in the logic layer of 3D-stacked memory or inside the dual in-line memory module (DIMM) of 2D-attached double data rate (DDRx) memory. Launching memory bound phases of applications to those cores requires changes to the threading model, hardware support to transfer machine state from the main core to the PIM hardware and vice versa. This complicates and delays transition from the main thread to the PIM thread and vice versa.

Some examples of a PIM architecture use dedicated engines for accelerating specific code idioms such as graph traversals (by generating addresses of dependent loads). These engines also need to be multithreaded (to support the graph traversals across multiple threads) and in-order. Offloading the kernel to those engines requires them to support scalar instruction execution as well which increases their complexity. In these examples, such PIM solutions assume accessing non-coherent PIM data by copying entire data structures from cacheable to non-cacheable part of the physical address space.

In one example, where PIM instructions are dispatched by the CPU core, PIM instructions are selectively offloaded based on cache locality. More specifically, these PIM instructions are executed on the CPU side (using dedicated execution units) if the data accessed by the PIM instructions are found in the cache hierarchy. Thus, this approach offloads instructions to the PIM device only in scenarios where the data locality is low. However, this also assumes dedicated hardware to execute PIM instructions inside the CPU core in parallel to the conventional CPU pipeline. In addition, this approach also requires extending the ISA with a whole new set of instructions (CPU core decoder modifications) that can be executed both on PIM and in the core (because these instructions may or may not be offloaded). Moreover, this approach requires synchronization of PIM instructions across CPU cores via a PIM directory, for example, resident in a PIM management hardware structure. Furthermore, in this approach, all PIM instructions must be executed atomically. Atomicity enforcement among these PIM instructions introduces delays because it requires round-trip communication between the CPU core and the PIM device.

Embodiments in accordance with the present disclosure provide hardware and instruction set architecture support in CPU cores, caches, and functional logic blocks that enables the offloading of computations to PIM devices or accelerators with fixed function capability. The hardware support requires no changes to the threading model of the original application and enables an application to perform fixed function computations on cacheable data without necessitating software cache management. Embodiments in accordance with the present disclosure reduce the complexity and overhead of offloading instructions by enabling instructions to be offloaded to a target device assuming cacheable, coherent data and without launching any additional threads.

An embodiment in accordance with the present disclosure is directed to a method of processor-guided execution of offloaded instructions using fixed function operations that includes receiving a set of instructions designated for remote execution by a target device. Each instruction in the set of instructions includes, as an operand, a target register in the target device. The method also includes transmitting, for each instruction in the set of instructions and in the order received, an offload request. The offload request includes the instruction designated for remote execution. In some examples, the offload target device is a processing-in-memory device. In other examples, the offload target device is an accelerator coupled to a memory device.

In some implementations, a processor implements an instruction set architecture extension that identifies the target register as a virtual register. In some examples, each of the plurality of instructions includes an opcode from a group of opcodes in the instruction set architecture extension implemented by the processor. In these examples, the group of opcodes in the instruction set architecture extension may consist of a remote load opcode, a remote computation opcode, and a remote store opcode.

In some implementations, transmitting, for each instruction in the set of instructions in the order received, an offload request includes generating a memory address for an instruction designated for remote execution and coupling the memory address with the offload request.

In some implementations, transmitting, for each instruction in the set of instructions in the order received, an offload request includes obtaining local data for the instruction designated for remote execution and coupling the local data with the offload request.

In some implementations, transmitting, for each instruction in the set of instructions in the order received, an offload request includes buffering the offload requests until after the oldest instruction in the set of instructions has retired.

In some implementations, the method also includes performing a cache operation on one or more caches that contain an entry corresponding to a memory address included in the offload request. The cache operation may include invalidating a cache entry containing clean data or flushing a cache entry containing dirty data. The cache operation may be performed on multiple caches that contain an entry corresponding to a memory address included in the offload request. The caches may be distributed across multiple core clusters each including multiple processor cores.

An embodiment in accordance with the present disclosure is directed to a multicore processor. The processor is configured to receive a set of instructions designated for remote execution by a target device. Each instruction in the set of instructions includes, as an operand, a target register in the target device. The processor is also configured to transmit, for each instruction in the set of instructions and in the order received, an offload request. The offload request includes the instruction designated for remote execution.

In some implementations, a processor implements an instruction set architecture extension that identifies the target register as a virtual register. In some examples, each of the plurality of instructions includes an opcode from a group of opcodes in the instruction set architecture extension implemented by the processor. In these examples, the group of opcodes in the instruction set architecture extension may consist of a remote load opcode, a remote computation opcode, and a remote store opcode.

In some implementations, the processor is also configured to buffer the offload requests until after the oldest instruction in the set of instructions has retired.

In some implementations, the processor is also configured to perform a cache operation on one or more caches that contain an entry corresponding to a memory address included in the offload request. The cache operation may include invalidating a cache entry containing clean data or flushing a cache entry containing dirty data. The cache operation may be performed on multiple caches that contain an entry corresponding to a memory address included in the offload request. The caches may be distributed across multiple core clusters each including multiple processor cores.

An embodiment in accordance with the present disclosure is directed to a system for processor-guided execution of offloaded instructions using fixed function operations. The system includes a processing-in-memory (PIM) device and a multicore processor that is configured to receive a set of instructions designated for remote execution by the PIM device. Each instruction in the set of instructions includes, as an operand, a target register in the PIM device. The processor is also configured to transmit, for each instruction in the set of instructions and in the order received, an offload request. The offload request includes the instruction designated for remote execution.

In some implementations, a processor implements an instruction set architecture extension that identifies the target register as a virtual register. In some examples, each of the plurality of instructions includes an opcode from a group of opcodes in the instruction set architecture extension implemented by the processor. In these examples, the group of opcodes in the instruction set architecture extension may consist of a remote load opcode, a remote computation opcode, and a remote store opcode.

In some implementations, the processor is also configured to buffer the offload requests until after the oldest instruction in the set of instructions has retired.

In some implementations, the processor is also configured to perform a cache operation on one or more caches that contain an entry corresponding to a memory address included in the offload request. The cache operation may include invalidating a cache entry containing clean data or flushing a cache entry containing dirty data. The cache operation may be performed on multiple caches that contain an entry corresponding to a memory address included in the offload request. The caches may be distributed across multiple core clusters each including multiple processor cores.

FIG. 1 sets for a block diagram illustrating an example system 100 for processor-guided execution of offloaded instructions using fixed function operations according to various embodiments of the present disclosure. In the example of FIG. 1, the system 100 includes a multicore processor 101 that includes multiple core complexes 102, 104 that include a cluster of cores (e.g., 2 or more cores sharing a last-level cache or interface). For example, the processor 101 may be implemented in a system-on-chip (SoC) architecture. In the example depicted in FIG. 1, each core complex 102, 104 includes multiple processor cores 106, 108, 110, 112 (e.g., central processing unit (CPU) cores, graphical processing unit (GPU) cores, etc.) respectively coupled to second-level (L2) caches 114, 116, 118, 120. Further, each of the processor cores 106, 108, 110, 112 includes respective primary (L1) caches 122, 124, 126, 128. Each of the processor cores 106, 108, 110, 112 includes various components of a processor pipeline (not depicted) such as an instruction fetch, decode, and dispatch pipeline, prefetch input queues, schedulers, load/store queues, lookaside buffers, reorder buffers, and retire queues as well as various arithmetic logic units (ALUs) and register files.

The configuration of the example system 100 depicted in FIG. 1 is presented for the purpose of explanation. Readers will appreciate that, while four processor cores 106, 108, 110, 112 are depicted in FIG. 1, the processor 101 may include more or fewer processor cores than depicted, as well as more or fewer core complexes, as well as more or fewer caches.

In the example depicted in in FIG. 1, each core complex 102, 104 includes a third level (L3) cache 130, 132 that serves as an interconnect cache, or last level cache (LLC), that connects all of the L2 caches of a particular core complex. In some examples, the processor 101 is configured to execute multithreaded applications using the multiple processor cores 106, 108, 110, 112. In these examples, a modification of data in a cache in one core complex 102 may affect the validity of data cached in another core complex 104. To enforce cache coherency, the processor 101 may include a coherency synchronizer 136 coupled to each L3 cache 130, 132 of the core complexes 102, 104. In these examples, the coherency synchronizer 136 initiates cache operations, for example, by transmitting cache probes to invalidate or flush data contained in cache entries of any L1, L2, or L3 cache present in the processor 101.

Each L1, L2, and L3 cache includes cache logic that, in response to a processor request, determines whether data associated with a requested operation is present in a cache entry of the cache. If the data is present (a 'cache hit'), the processor request is fulfilled using the data present in the cache entry. If the data is not present (a 'cache miss'), the request is forwarded to the next-level cache until a cache miss is detected in the LLC. In response to a cache miss in the LLC, the cache is forwarded to a memory controller 134 of the processor 101 to fulfill the request using data stored in main memory (e.g., memory device 138). In one example, the processor requests are input/output (I/O) operations, such as read/write requests, directed to a memory location in the memory device 138.

Each of the processor cores 106, 108, 110, 112 executes machine language code created by a compiler system (e.g., GNU Compiler Collection (GCC)) from an application that executes on the processor 101. For example, the application may be a single-threaded or multithreaded application. The processor cores implement an instruction set architecture (ISA) utilized by the compiler system for generating the machine language code. In one example, the ISA for the processor 101 is the x86-64 instruction set with support for advanced vector extension such as AVX-256.

In accordance with various embodiments of the present disclosure, the processor 101 implements an extended ISA with three opcodes for offloading operations to an offload target device as well an architected register file for the offload target device. For example, the offload target device may be a remote component that implements fixed functions, such as a processing-in-memory (PIM) device or an accelerator, as described in more detail below. In the extended ISA, a remote_load instruction opcode loads data of a memory operand from main memory into a local register of the offload target device, while a remote_store instruction opcode writes data from a local register of the offload target device to a memory operand in main memory. A remote_op instruction opcode in the extended ISA can represent any arithmetic or logical operation supported by the target device's fixed function architecture. None of the operations modifies control flow and thus the offloaded instructions are executed in sequence. The offload remote_op instruction source operands can be (a) a memory address (specified in the same way as in the baseline ISA), (b) an architectural register (from the CPU core standard ISA), or (c) an offload target register implemented in the offload target device. In some implementations, an offload instruction destination operand can only be an offload target register. The offload target registers are architected registers within the extended ISA that represent registers local to the offload target fixed function logic and are allocated by the compiler. The offload target registers are virtual in that they have no physical storage in the processor core, and are used to support data dependencies between offload instructions and to track offload target register usage at the memory controller 134 when the offload requests are sent to fixed function module 146.

In some implementations, the remote_load instruction includes a destination operand that is an offload target register, a source operand that is a memory address, and another source operand that is an architectural register that is used to generate a memory address. The remote_load instruction indicates that the offload target device should load data from the memory location identified by the memory address into the offload target register. In the case where the offload target is a PIM device, the remote_load instruction indicates that the PIM device should load the data from the memory location in the PIM device identified by the memory address into a PIM register, as explained in detail below.

In some implementations, the remote_store instruction includes a destination operand that is a memory address, a source operand that is an offload target register and another source operand that is an architectural register used to generate the memory address. The remote_store instruction indicates that the offload target device should store data in the offload target register to memory location identified by the memory address. In the case where the offload target device is a PIM device, the remote_store instruction indicates that the PIM device should store data from the target register in the memory location in the PIM device identified by the physical memory address, as explained in detail below.

In some implementations, the remote_op instruction includes a destination operand that is a offload target register and source operands for a computation, where the source operands may be architectural registers (carrying values from prior non-offloaded computations), offload target registers or a memory address (generated from an architectural register also specified in the remote_op instruction). The remote_op instruction indicates that fixed function logic in the offload target device should perform the computation and place the result in the offload target register indicated by the destination operand. In the case where the offload target device is a PIM device, the remote_op instruction indicates that the PIM device should perform a function within the memory logic of the PIM device, as explained in detail below.

In some implementations, the offload instructions are generated by the compiler at application compile time using the extended ISA. In one example, the compiler identifies offload instructions in source code based on indications in application source code provided by the programmer, for example, using an application programming interface (API) for offloading. In another example, the compiler identifies instruction for offloading based on a determination that the instructions are suitable for offloading. The offload instructions may be identified as a region of interest (ROI) in the source code. Each dynamic instance of an ROI in the source code may be identified as an offload transaction that includes one or more offload instructions. For example, an offload transaction may include remote_load instruction, one or more remote_op instructions, and a remote_store instruction. An offload transaction can be a loop iteration or a subroutine or a subset of subroutine's body. The offload transaction is a sequential piece of code and does not include any control flow changing instructions. In some examples, special instructions can mark the beginning and end of each offload transaction.

In some implementations, an offload instruction is fetched, decoded, and dispatched (e.g., by the front-end pipeline of the core), as would be performed for any typical non-offload instruction. After the offload instruction is dispatched and once the offload instruction has been picked by a scheduler, core resources are used to generate virtual and/or physical addresses for any memory locations identified in the offload instruction (e.g., in remote_load, remote_store and remote_op instructions that have a memory operand) and any values consumed by offload instructions from core registers (e.g., computed from non-offload instructions). After the virtual and/or physical addresses have been generated and the values from core registers are available, an offload instruction is ready to retire. Even though offload instructions are picked by a scheduler, these instructions do not execute any operations in the core's ALUs (vector or scalar, integer or floating point), neither do they modify machine state when issued by the core, including architected registers and flags as defined in the core's standard ISA. Offload instructions are ready to retire as soon as they have completed the operations (address generation and/or reading values computed by non-offload instructions) mentioned above without violating memory ordering. In the event of pipeline flushing (e.g., due to branch mispredictions, load-store forwarding data dependence violations, interrupts, traps, etc.), the offload instructions can be flushed like conventional instructions because they occupy instruction window entries like non-offload instructions. Further, because remote_op instructions do not execute on the core's ALUs, no arithmetic error traps are detected for them. However, other traps (e.g., for virtual or physical address generation, instruction breakpoints, etc.) generated by offload instructions are detected and served inside the core pipeline with the same mechanisms used for non-offload instructions.

Once the offload instructions retire, the generated memory addresses and values of any core register operands are included in an offload request generated for the offload instruction. The offload request includes the offload instruction including the offload target register as well as any generated memory address or register values need to complete the offload instruction and store the result in the offload target register. In some implementations, an offload request first-in-first-out (FIFO) queue for the offload requests is utilized to maintain programmatic sequence for the instructions as they retire. In one example, the offload instruction may be retired only when the end of an offload transaction is reached in the offload request FIFO. There may be one offload request FIFO per thread if the core supports multi-threading. Each offload request is issued to the offload target device in program order by the core at retire time to be executed in the same program order remotely in the offload target device.

In some examples, after an offload request is issued by a processor core 106, 108, 110, 112, the offload request is received by the coherency synchronizer 136. The coherency synchronizer 136 performs cache operation on the various caches of the core complexes 102, 104 to ensure that any cache entries for virtual and/or physical addresses identified in the offload request remain coherent. For example, when an offload request includes as an operand a virtual and/or physical address, the coherency synchronizer 136 performs a cache probe to identify cache entries in the L1, L2, and L3 caches of the core complex that contain cache entries for the virtual and/or physical addresses identified in the offload request. If the identified cache entry contains clean data, the cache entry is invalidated. If the identified cache entry contains dirty data, the data in the cache entry is flushed to main memory (i.e., the memory device). In some examples, cache entries corresponding to virtual and/or physical addresses identified in the offload request issued by a particular core in a core complex may be invalidated/flushed before reaching the coherency synchronizer 136, such that the coherency synchronizer 136 performs the cache probe only on other core complexes in the system 100. In other examples, the coherency synchronizer 136 receives the offload request directly and performs the cache probe on all core complexes in the system 100. A memory fence may be employed to ensure that younger non-offload instructions in the instruction queue do not access any cache entries for virtual and/or physical addresses identified in the offload request(s) until those cache entries have been invalidated or flushed. In this way, the younger non-offload instructions are prevented from accessing stale cache data and must instead retrieve the data from main memory (which may have been modified by a prior offload request). After the appropriate cache operations have completed, the offload request is transmitted to the memory controller 134 for offloading to the offload target device. The operation of the coherency synchronizer will be described in greater detail below.

In some implementations, the memory controller 134 receives the offload requests, which may be configured as I/O requests (e.g., a write request) with a flag that indicates the I/O request is an offload request. In these implementations, the memory controller 134 decodes the request to determine that the request is an offload request and identifies the offload instruction as well as operands for completing the offload request. The memory controller 134 identifies the requested operation via a pointer to a command buffer located in the offload target device from the offload request. The memory controller 134 breaks the offload request into one or more commands that are transmitted to the offload target device. In examples where the target device is a PIM device, the request may be a PIM request that is broken into one or more PIM commands by the memory controller 134.

In the example depicted in FIG. 1, the processor 101 is coupled to a memory device 138 that includes one or more memory arrays 142 for storing data. In some examples, the memory device 138 is a stacked dynamic random-access memory (DRAM) device that includes multiple memory dies stacked on a memory interface logic die that interfaces with the processor 101. For example, the memory device 138 may be a high bandwidth memory (HBM) module or a hybrid memory cube (HMC) module. In other examples, the memory device 138 may be an in-line memory module such as a dual in-line memory module (DIMM) that includes memory interface logic. The memory controller 134 issues commands to the memory logic 140 of the memory device 138, such as read requests, write requests, and other memory operations. In some implementation, commands transmitted to the memory device 138 by the memory controller 134 may be flagged as offload commands.

In some embodiments, the memory device 138 includes a processing-in-memory (PIM) device in that the memory logic 140 is designed to perform memory operations and a set of non-memory operations or functions (e.g., arithmetic and logical operations) within the memory device 138. n some implementations, the memory device 138 includes a separate register file 144 that may be used to provide operands to operate on by the functions.

In embodiments where the offload target is the memory device 138, and where the memory device is a PIM device, the memory device 138 receives offload commands generated from the offload requests from the memory controller 134 of the processor 101. In the example depicted in FIG. 1, the memory logic 140 is coupled to fixed function module 146 for implementing fixed functions identified in a PIM request. The fixed function module 146 may include a command buffer that is populated with the actual commands to be executed by the fixed function module 146 by the operating system after a thread including the offload instruction is launched. In some implementations, the opcode of each offload instruction includes an embedded pointer to the command for the operation (load, store, add, subtract, multiply, increment, etc.) that is too be performed in the offload target device. When an offload request is generated from an offload instruction, this pointer also included in the offload request. In these implementations, when generating the offload commands, the memory controller uses the pointer in the offload request to identify the location in the command buffer of the offload target device that includes the actual command for the operation.

Consider a simple example where the memory device is a PIM device and, at compile time, the compiler system allocates a register r1 in the register file 144 and issues a multiply instruction to the fixed function module 146. In this simplified example, consider that the core 106 receives the following instructions:

pimLd r1, [5000];
pimOp r1, r1, 10;
pimSt [6000], r1;

where pimLd is a remote_load instruction, pimOp is a remote_op instruction, and pimSt is a remote_store instruction. The core generates PIM requests that are transmitted to the memory controller, as previous discussed. The memory controller 134 receives a sequence of PIM requests (received in the same program order indicated in the original machine code). In this example, the memory controller 134 receives a first PIM request that includes a load operation with a destination operand that is register r1 and a source operand that is physical memory address 5000 in a memory array 142. The memory controller 134 transmits one or more commands to the memory logic 140 for reading the address 5000 and loading the data into register r1 in the register file 144. The memory controller 134 then receives a second PIM request that includes a remote execution instruction with a destination operand that is register r1, a source operand that is register r1, and a source operand that is a scalar value (e.g., 10) obtained from the PIM request, as well as a pointer to the multiply instruction in the fixed function module 146. The memory controller 134 transmits one or more commands to the memory logic 140 for executing the multiply instruction in the fixed function module 146, where an ALU of the memory logic 140 is used to multiply the data in r1 by 10, and the result is written to register r1. The memory controller 134 then receives a third PIM request that is a store operation with a destination operand that is physical memory address 6000 in a memory array 142 a source operand that is register r1. The memory controller 134 transmits one or more commands to the memory logic 140 for storing the data in register r1 in a memory location identified by the physical memory address 6000.

In some examples, the coherency synchronizer 136 and memory controller 134 may be implemented on an I/O die 150 that is distinct from dies 154, 156 implementing the core complexes 102, 104. The I/O die 150 may be coupled through one or more channels to a memory interface die (not shown) that includes the memory logic 140 and fixed function module 146. One or more memory components each including a memory array 142 may be stacked on top of the memory interface die and coupled to the memory interface die using through-silicon vias. The I/O die 150 may be coupled to the core complex dies 154, 156 through an on-chip fabric.

Figure 2:
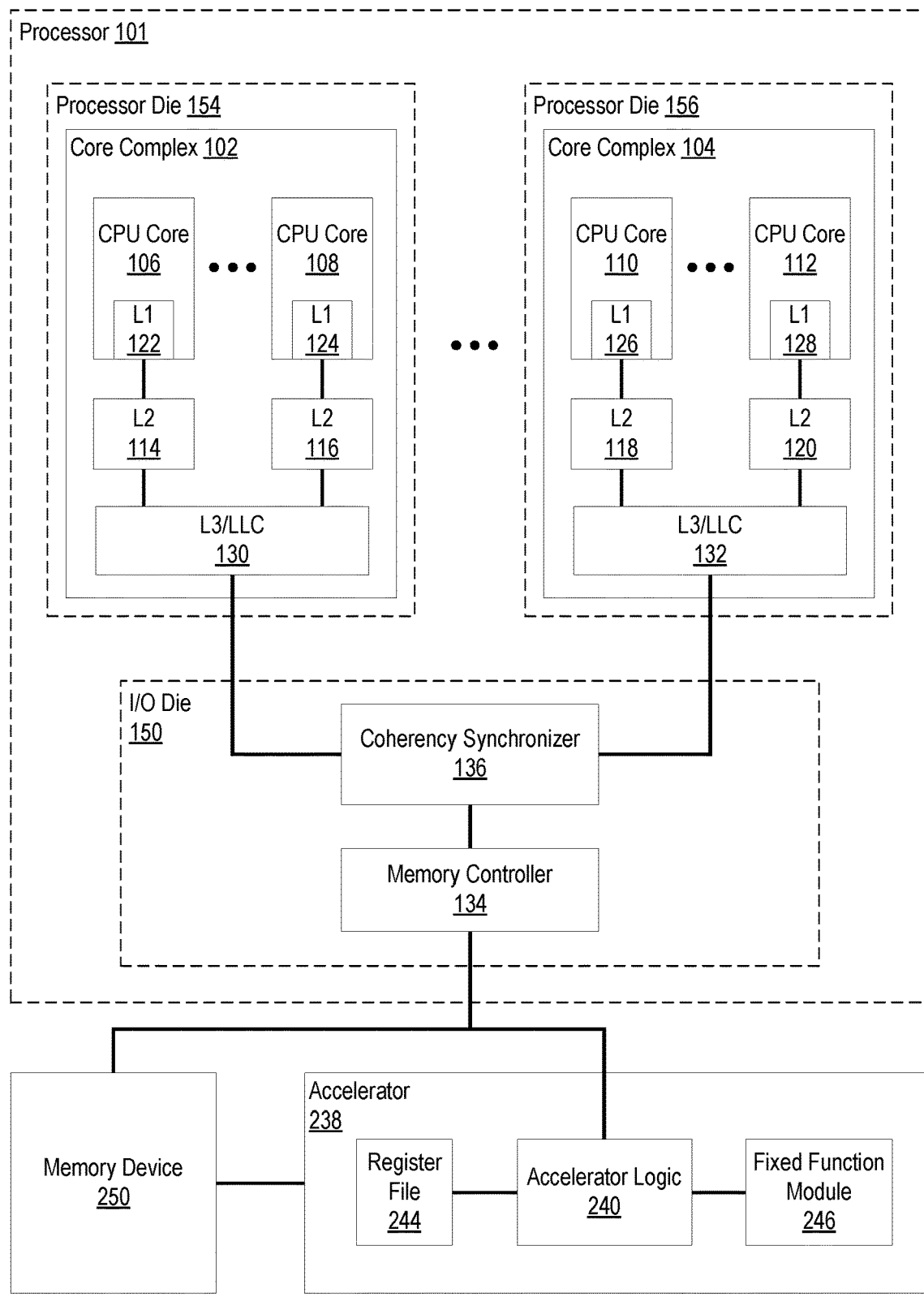
FIG. 2 sets forth a block diagram of another example system for processor-guided execution of offloaded instructions using fixed function operations according to embodiments of the present disclosure.

FIG. 2 sets for a block diagram illustrating another example system 200 for processor-guided execution of offloaded instructions using fixed function operations according to various embodiments of the present disclosure. The example of FIG. 2 is similar to the example system of FIG. 1 in that the system 200 also includes the multicore processor 101. The example system 200 is different from the example system 100 of FIG. 1 in that the offload target device is an accelerator 238 coupled to a memory device 250. The accelerator 238 is used by the processor 101 to remotely execute offloaded instructions. For example, the offloaded instructions may be loop iterations, a subroutine, a subset of subroutine's body, or other sequential piece of code as discussed above. In this embodiment, the accelerator 238 behaves similarly to the memory device 138 that is configured as a PIM device, as discussed above, in that the extended ISA implemented by the processor 101 may be utilized for offloading instructions to the accelerator 238. However, the accelerator 238 may be used to execute offloaded instructions on data in memory devices (e.g., memory device 250) that are not PIM devices.

The accelerator 238 includes accelerator logic including processing resources designed to perform memory operations (load/store) and non-memory operations (e.g., arithmetic and logical operations) within the accelerator 238. For example, the accelerator 238 may load data from the memory device 250, perform computations on data, and store data in the memory device 250. In some implementations, the accelerator 238 is designed to implement a set of fixed functions, which may be executed by the accelerator logic 240. In these implementations, the accelerator 238 includes a register file 244 used to provide the operands needed to execute the fixed functions. Registers in the register file 244 may be targeted in offload instructions as source or destination operands using the extended ISA discussed above.

The accelerator 238 receives offload commands generated from the offload requests from the memory controller 134 of the processor 101. In the example depicted in FIG. 2, the accelerator logic 240 is coupled to fixed function module 246 for implementing a set of fixed functions identified in a PIM request. The fixed function module 246 may include a command buffer that stores the actual commands to be executed by the fixed function module 246. The command buffer is populated by the operating system when an application thread including the offload instructions is launched. The processing of offload commands is similar to the processing of offload commands performed by the memory device 138 as discussed above, except that the memory array is not local to the accelerator 238 as it is in the memory device 138.

Figure 3:
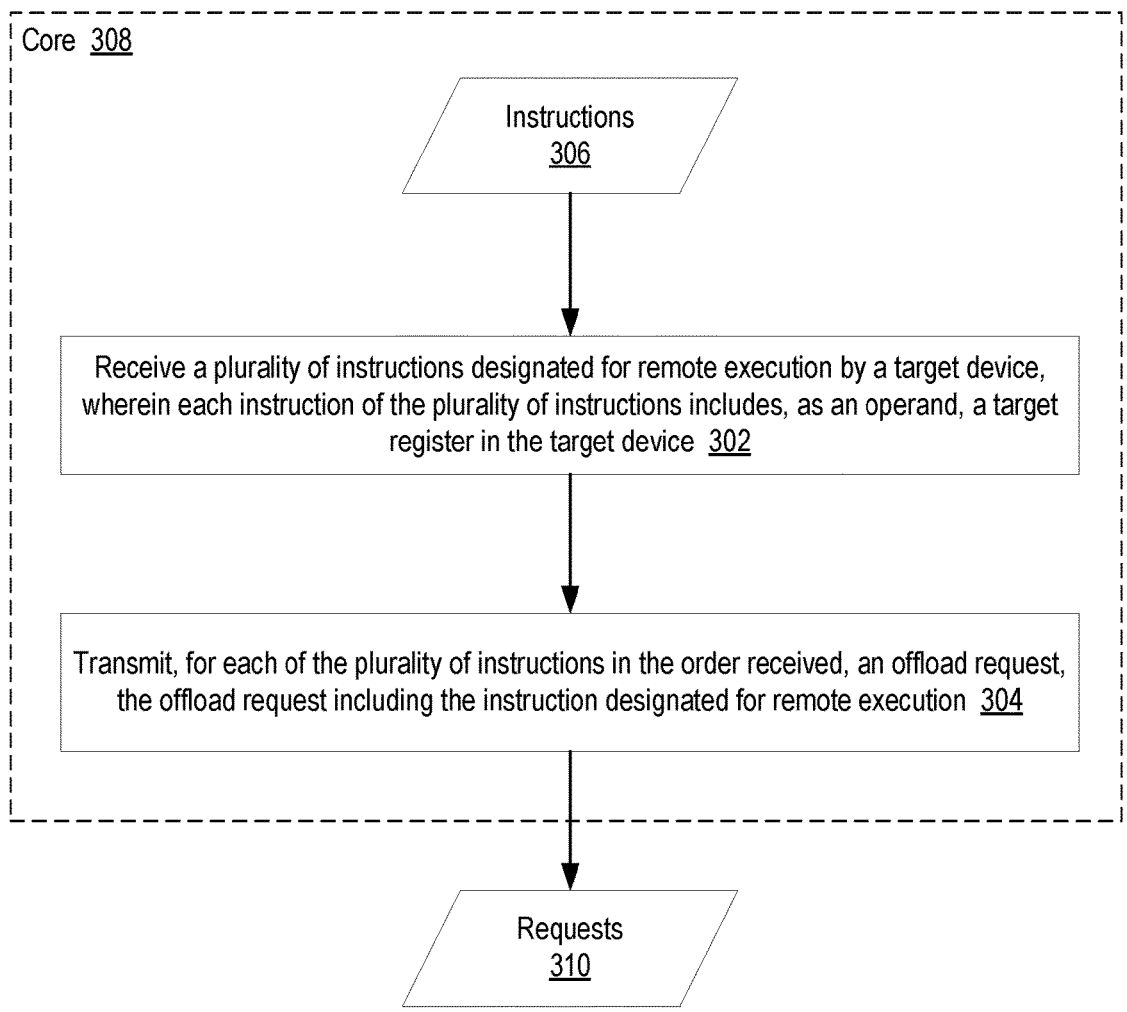
FIG. 3 sets forth a flow chart illustrating an example method of processor-guided execution of offloaded instructions using fixed function operations in accordance with embodiments of the present disclosure.

For further explanation, FIG. 3 sets forth a flow chart illustrating an exemplary method for processor-guided execution of offloaded instructions using fixed function operations according to embodiments of the present disclosure. The exemplary method of FIG. 3 includes receiving 302 a plurality of instructions 306 designated for remote execution by a target device, wherein each instruction of the plurality of instructions 306 includes, as an operand, a target register in the target device. In some implementations, receiving 302 a plurality of instructions 306 designated for remote execution by a target device, wherein each instruction of the plurality of instructions 306 includes, as an operand, a target register in the target device is carried out by a processor core 308 receiving a plurality of offload instructions, wherein each offload instruction includes an operand that identifies a remote register in an offload target device, as discussed above. For example, the offload target device may be a PIM device or an accelerator coupled to a memory device. The processor core 308 may be, for example, any of the processor cores 106, 108, 110, 112 depicted in FIG. 1.

In the example of FIG. 3, the plurality of instructions 306 may be offload instructions that are included in an offload transaction. One or more offload transactions may be interleaved within machine language code that includes non-offload instructions (i.e., conventional instructions). In some examples, the beginning and end of an offload transaction are indicated within the code, such that the core 308 may recognize, at least, the end of a sequence of offload instructions. In some cases, a compiler system may use programmatic hints in the source code of an application to recognize portions of the source code that should be rendered as offload instructions designated for remote execution. For example, the programmer may use an API provided by the compiler system to provide indications that a particular portion of source code should be rendered as offload instructions. In some cases, a compiler system may recognize a particular portion of source code as code that could be optimized by remote execution, and may render that source code in machine language code that includes offload instructions.

In the example of FIG. 3, the core 308 may implement the extended ISA discussed above, such that each instruction in the plurality of instructions 306 designated for remote execution is one of a group of operations consisting of a remote_load instruction, a remote processing instruction, and a remote_store instruction. As discussed above, extended ISA defines these instructions, as well as a remote register file local to the offload target device that is used by the remotely executed operations. Each of the plurality of instructions 306 includes, as an operand, at least one of the remote registers in the target device specified in the extended ISA. These remote registers in the offload target device do not occupy storage space within the core 308. The remote registers are used to create data dependencies among the plurality of instructions 306 and used to track register use at the offload target where instructions will be executed. In some implementations, either the destination operand or a at least one source operand of any offload instruction is a remote register in the offload target device.

Consider an example where an instruction in the plurality of instructions 306 is a remote_load or remote_store instructions. In this example, the remote_load instruction includes a destination operand that is a remote register in the offload target device and a source operand that is a pointer to a memory location in a virtual or physical address space; similarly, the remote_store instruction includes a destination that is a pointer to a memory location in a virtual or physical address space and a source operand that is a remote register in the offload target device.

Consider another example where an instruction in the plurality of instructions 306 is a remote_op instruction. In this example, the remote_op instruction includes a destination operand that is a remote register in the offload target device and two more source operands that may be remote registers in the offload target device or general registers local to the processor core. The general registers local to the processor core may include data computed from non-offload instructions. The result of any remote_op computation is stored in the destination remote register of the offload target device and made available for further computation in the sequence of offload instructions or to write to memory as part of a remote_store operation. In some examples, the remote_op instruction (as well as the remote_load and remote_store instructions) includes a pointer to a command buffer location in the offload target device that stores the actual opcode and remote register operands within the offload target device. The pointer to the command buffer may be provided by the compiler system that may be passed through the core as metadata for the remote_op instruction. In other examples, the operation associated with an offload instruction may be inferred (e.g., by memory logic 140 from the sequence of the instructions 306). In this example, the core 308 does not need to decode the specific operation implemented by the in the offload target device.

The method of FIG. 3 also includes transmitting 304, for each of the plurality of instructions 306 in the order received, an offload request 310, the offload request 310 including the instruction designated for remote execution. In some implementations, transmitting 304, for each of the plurality of instructions 306 in the order received, an offload request 310, the offload request including the instruction designated for remote execution is carried out by processor core 308 generating a offload request 310 in the form of a request packet that includes the offload instruction as well as a header and/or metadata pertaining to the offload instruction. In some examples, the request packet includes a header or a flag that indicates that the request is an offload request for remote execution. In some examples, the request packet includes an instruction field that indicates whether the instruction is a remote_load, remote_op, or remote_store instruction. The request packet may include two or more operand fields, where the operands may be remote registers in the target device, physical memory address, and values obtain from general registers local to the processor core 308. In the case of a remote_op instruction, the request packet may include a field containing a pointer to a command buffer entry in the offload target device. The offload request 310 may also include a thread identifier of the core 308 when the application is a multithreaded application.

In some implementations, the instructions 306 are part of an offload transaction that includes a start marker, the instructions 306, and an end marker. In these examples, after the instructions 306 retire, the instructions 306 included in the offload transaction may be held until all instructions 306 in the offload transaction have retired. That is, when all of the operand data for each instruction is available (e.g., generated memory addresses, register values computed from other non-offload instructions) for inclusion in each request, the offload instructions are retired. If the offload instruction having an end marker (to indicate that the end of the offload transaction) has retired, and all of the instructions 306 have retired, the offload requests may be issued from the processor core 308. Thus, the plurality of offload requests corresponding to the plurality of instructions (e.g., in an offload transaction) are transmitted after all of the instructions have retired (e.g., from a reorder buffer). In this way, programmatic order of the plurality of instructions 306 in an offload transaction may be preserved to facilitate use of the remote registers to maintain data dependencies.

In some implementations, a FIFO structure may be used to maintain the sequence of offload instructions in an offload transaction after retirement but before issuing from the processor core 308.

In some implementations, after the offload request 310 is dispatched from the core 308, the offload request 310 is received at the coherency synchronizer (e.g., the coherency synchronizer 136, either directly from the processor core 308 or from the L3 cache of the core complex including the processor core 308, as explained in greater detail below. The coherency synchronizer 136 may perform a cache operation to invalidate or flush data in caches that include a cache entry corresponding to a memory address contained in the offload request 310, including caches of other processor cores and core complexes. Once the coherency synchronizer determines (e.g., from invalidation probe responses) that all cache entries corresponding to a memory address included in an offload request 310 have been invalidated, the offload request 310 is forwarded to the memory controller 134 for transmission to an offload target (e.g., a memory interface of a memory device) over a link. The memory controller 134 may transmit the offload request 310 as part of an offload command. Readers will appreciate that, through the use of remote execution using remote registers, no data (apart from data included in the command) is transferred between the offload target device and data buffers in the processor 101.

Given that offload instruction code is interleaved with non-offload instruction code, explicit synchronization before and after offload instruction code may be needed to enforce data dependencies and memory consistency between offload instruction code and non-offload instructions accessing memory. For example, the programmer may be responsible for ensuring explicit synchronization by specifying what code can be offloaded. Conventional synchronization primitives such as barriers and memory fences between non-offload instruction code and the following offload instruction code can be inserted by the programmer/compiler to establish coherency of offload instruction data accesses at any granularity (e.g., wider than the typical 64B). A synchronization primitive may be employed to enforce the same properties between offload instruction code and following non-offload instruction code. Such a synchronization primitive may be used to block younger non-offload instruction memory accesses until all offload instruction memory accesses have updated memory. In the present disclosure, offload instructions update memory after they retire so consistency must be guaranteed by releasing such a synchronization primitive on all cores when the offload requests pass the coherency synchronizer 136.

Readers will appreciate that the extended ISA requires only three additional instructions to a processor's standard ISA. Readers will further appreciate that architected registers reserved for remote execution can be used to enforce data dependencies in the remote execution of offloaded instructions. Readers will further appreciate that all remotely executed instructions within an offload transaction are dispatched in program order by the processor core at retire time and executed in the same program order remotely, thus allowing obviating the need for atomicity enforcement or responses from the offload target device. Readers will further appreciate that, the registers reserved for remote execution do not occupy physical storage space within the system 100.

Figure 4:
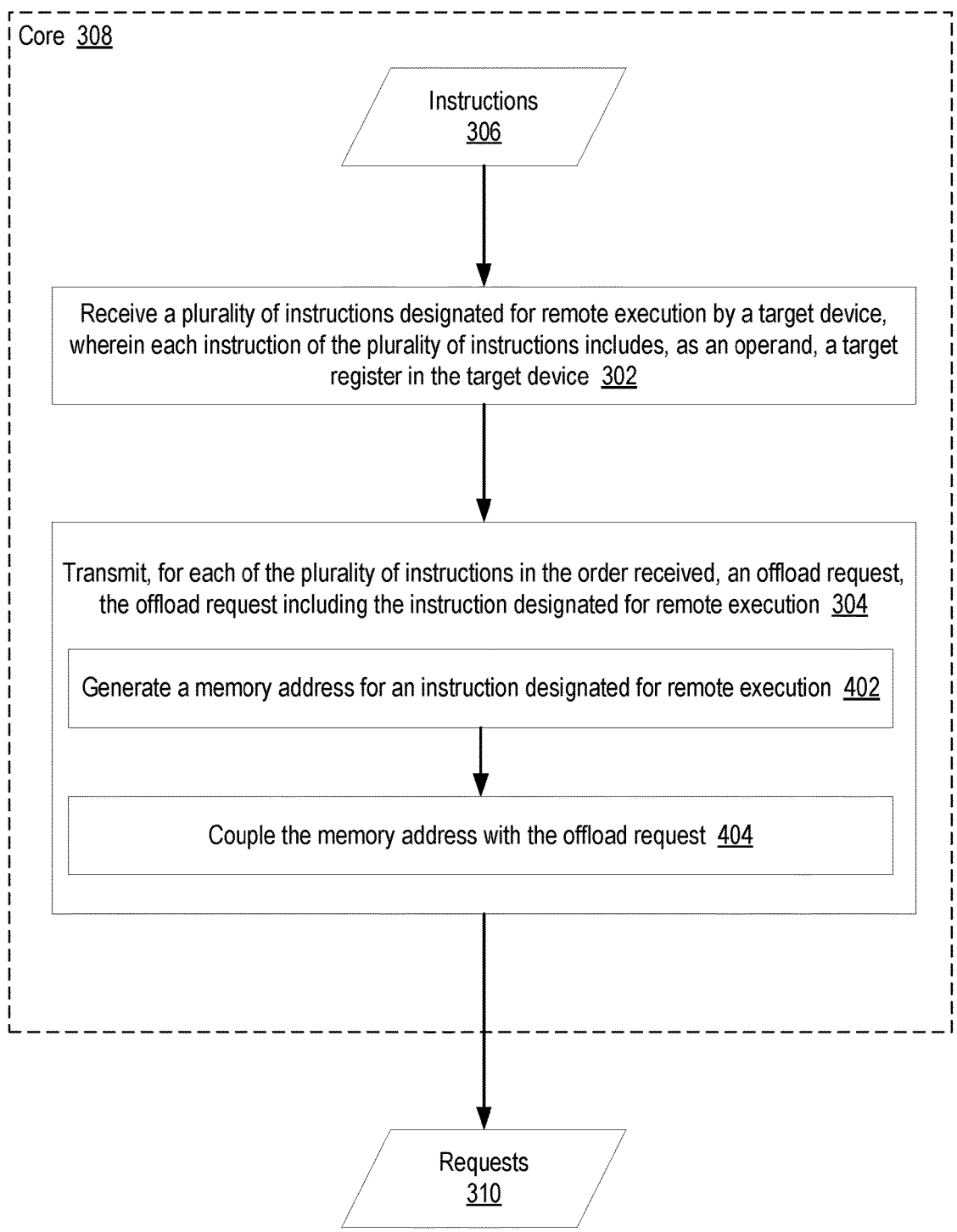
FIG. 4 sets forth a flow chart illustrating another example method of processor-guided execution of offloaded instructions using fixed function operations in accordance with embodiments of the present disclosure.

For further explanation, FIG. 4 sets forth a flow chart illustrating another exemplary method for processor-guided execution of offloaded instructions using fixed function operations according to embodiments of the present disclosure. Like the exemplary method of FIG. 3, the method of FIG. 4 also includes receiving 302 a plurality of instructions 306 designated for remote execution by a target device, wherein each instruction of the plurality of instructions 306 includes, as an operand, a target register in the target device and transmitting 304, for each of the plurality of instructions 306 in the order received, an offload request 310, the offload request 310 including the instruction designated for remote execution.

In exemplary method of FIG. 4, transmitting 304, for each of the plurality of instructions 306 in the order received, an offload request 310, the offload request 310 including the instruction designated for remote execution includes generating 402 a memory address in an instruction designated for remote execution. In some examples, generating 402 a memory address in an instruction designated for remote execution is carried out by identifying an array element in an instruction and calculating the in-memory position of the array element. For example, generating 402 a memory address in an instruction designated for remote execution may be carried out by an address generation unit (AGU) of the core 308. The generated memory address may be a virtual or physical memory address. In accordance with the present disclosure, the remotely executed instructions may operate on cacheable data managed in virtual memory.

Consider an example where an instruction designated for remote execution is a remote_load or remote_store instruction that will be executed by the offload target device. In this example, the remote_load identifies a pointer to an element in an array or vector as a source operand and the remote_store identified a pointer to an element in an array or vector as a destination operand. In this example, an AGU of the core 308 generates the memory address by calculating the in-memory position of the identified element (i.e., the source or destination memory operand).

In the method of FIG. 4, transmitting 304, for each of the plurality of instructions 306 in the order received, an offload request 310, the offload request 310 including the instruction designated for remote execution also includes coupling 404 the generated memory address with the offload request. In some examples, coupling 404 the generated memory address in the offload request is carried out by storing the generated memory address in a memory address field of the offload request when the calculated memory address becomes available. For example, the offload request may be generated and queued to await memory address generation, among other data. Once the memory address for the memory operand becomes available from the AGU, the memory address is inserted into a memory address field of the offload request.

In this way, when the offload target device receives the offload request, the offload target device does not need access to processor registers to perform address generation, nor does the offload target device need to use its own resources to generate the address. Thus, the offload target device, when executing a remote instruction such as a remote_load or a remote_store instruction, receives all of the information necessary for completing the instruction from the core 308, including the executable operation, a target register local to the offload target device to be used in carrying out the operation, and a memory operand to use as the load/store source/destination operand.

Figure 5:
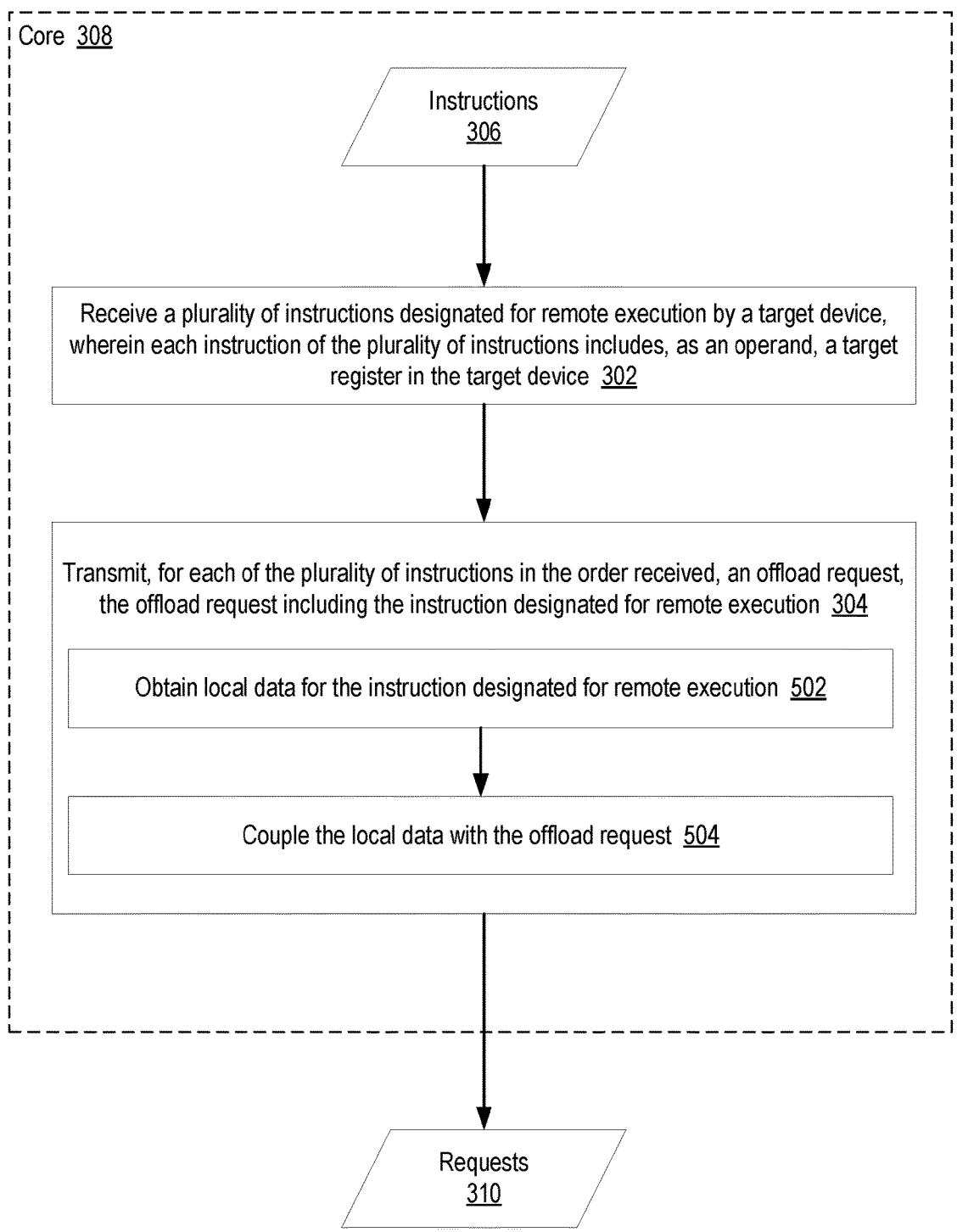
FIG. 5 sets forth a flow chart illustrating another example method of processor-guided execution of offloaded instructions using fixed function operations in accordance with embodiments of the present disclosure.

For further explanation, FIG. 5 sets forth a flow chart illustrating another exemplary method for processor-guided execution of offloaded instructions using fixed function operations according to embodiments of the present disclosure. Like the exemplary method of FIG. 3, the method of FIG. 5 also includes receiving 302 a plurality of instructions 306 designated for remote execution by a target device, wherein each instruction of the plurality of instructions 306 includes, as an operand, a target register in the target device and transmitting 304, for each of the plurality of instructions 306 in the order received, an offload request 310, the offload request 310 including the instruction designated for remote execution.

In exemplary method of FIG. 5, transmitting 304, for each of the plurality of instructions 306 in the order received, an offload request 310, the offload request 310 including the instruction designated for remote execution includes obtaining 502 local data for the instruction designated for remote execution. In some examples, obtaining 502 local data for the instruction designated for remote execution includes reading data from local processor registers or data forwarded from a bypass network. In these examples, the instruction designated for remote execution identifies a processor register that contains data local to the processor system (e.g., processor 101 in FIG. 1) for executing the instruction. For example, the instruction identifies registers that hold data (e.g., scalar values) computed from other non-offload instructions.

Consider an example where the instruction designated for remote execution is a remote_op instruction. In this example, the remote_op instruction identifies a remote register (i.e., a register of the offload target device) as a destination operand and at least one source operand that is a local register of the core 308. In this example, the remote_op instruction is associated with metadata that includes a pointer to a command buffer entry in the offload target device. When the source data becomes available in the local register, the source data is obtained by reading the data from the local register.

In the method of FIG. 5, transmitting 304, for each of the plurality of instructions 306 in the order received, an offload request 310, the offload request 310 including the instruction designated for remote execution also includes coupling 504 the local data with the offload request. In some examples, coupling 504 the local data with the offload request is carried out by copying data read from local registers or the processor core 308 bypass network into a source operand field of the offload request after the data becomes available. For example, the offload request may be generated and queued to await data computed from other non-offload instructions, among other data. Once the data becomes available in local processor registers or via the processor core's 308 bypass network (not shown), the data is inserted into a source operand field of the offload request. In this way, when the offload target device receives the offload request, the offload target device does not need access to processor registers (e.g., memory mapped registers) to execute the operation, nor does the offload target device need to use its own resources to calculate scalar values. Thus, the offload target device, when executing a remote instruction such as a remote_op instruction, receives all of the information necessary for completing the instruction from the core 308, including the executable operation, a destination register local to the offload target device for storing the result of the operation, at least one source operand that is data obtained from the core 308, and a pointer to the command buffer entry in the fixed function module of the offload target device.

Figure 6:
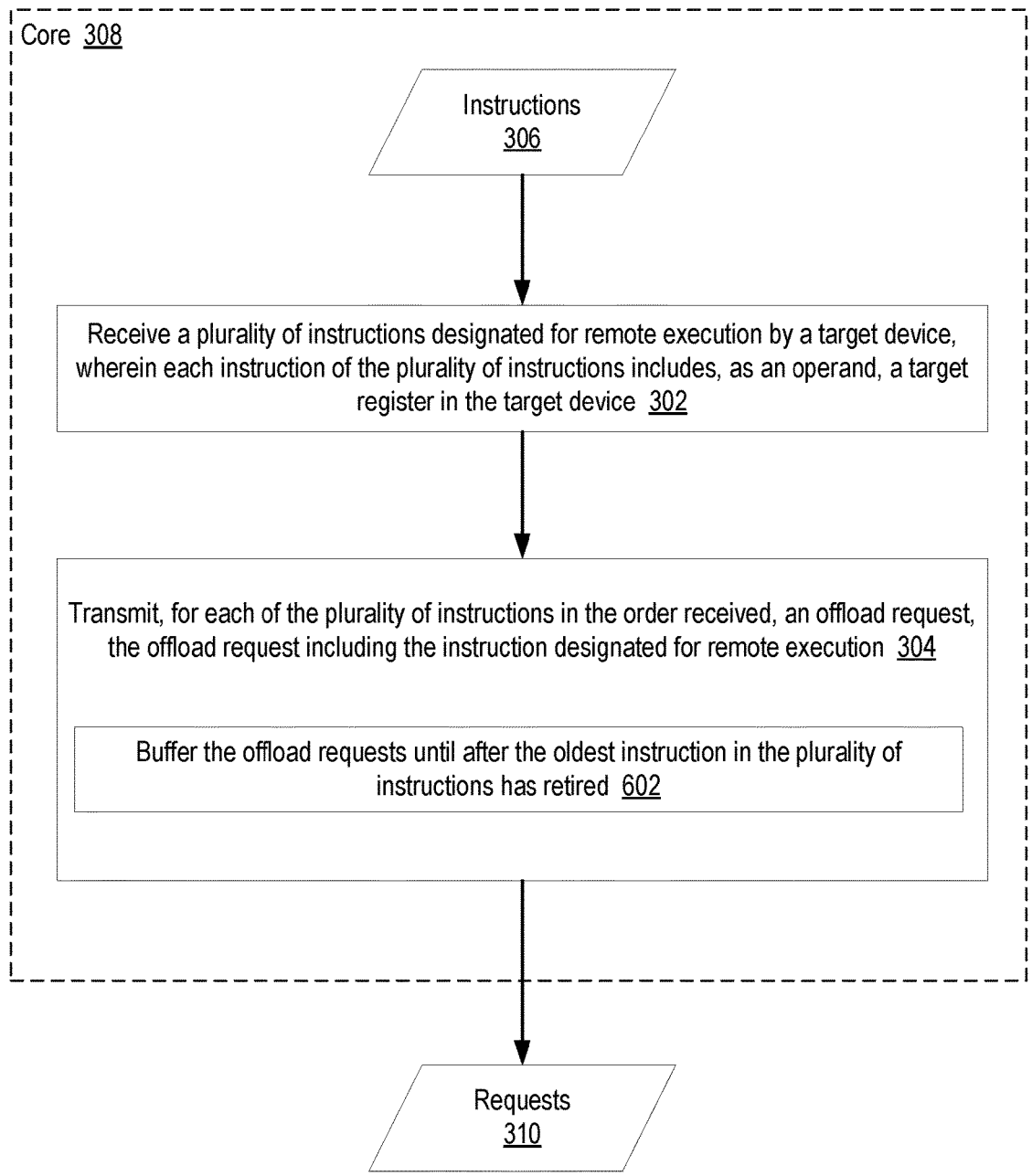
FIG. 6 sets forth a flow chart illustrating another example method of processor-guided execution of offloaded instructions using fixed function operations in accordance with embodiments of the present disclosure.

For further explanation, FIG. 6 sets forth a flow chart illustrating another exemplary method for processor-guided execution of offloaded instructions using fixed function operations according to embodiments of the present disclosure. Like the exemplary method of FIG. 3, the method of FIG. 6 also includes receiving 302 a plurality of instructions 306 designated for remote execution by a target device, wherein each instruction of the plurality of instructions 306 includes, as an operand, a target register in the target device and transmitting 304, for each of the plurality of instructions 306 in the order received, an offload request 310, the offload request 310 including the instruction designated for remote execution.

In exemplary method of FIG. 6, transmitting 304, for each of the plurality of instructions 306 in the order received, an offload request 310, the offload request 310 including the instruction designated for remote execution includes buffering 602 the offload requests until after the oldest instruction in the plurality of instructions has retired. In some examples, buffering 602 the offload requests until after the oldest instruction in the plurality of instructions has retired is carried out by detecting the beginning and end of an offload transaction containing the plurality of instructions 306 and delaying the transmission of any of the instructions 306 until the last instruction in the offload transaction has retired. In these examples, special instructions marking the beginning and end of the offload transaction may be employed to delineate the bounds of the offload transaction, such that the offload transaction may represent a group of offloaded instructions. In some implementations, a FIFO is used to buffer each offload request when the corresponding offload instruction in the offload transaction retires. Once the oldest instruction in the plurality of instructions 306 retires, the offload requests pending in the FIFO are dispatched for transmission to the offload target device, thus preserving the instruction sequence and dependencies. In some examples, a special instruction indicating the end of the offload transaction is received. At the retirement of this instruction, it may be determined that all instructions in the offload transaction have retired. When received at the memory controller 134 the sequentially received offload requests are used to generate offload commands that are transmitted to the offload target in sequential order. In this way, all remotely executed instructions within an offload transaction are dispatched in program order by the core and executed in the same program order remotely.

Figure 7:
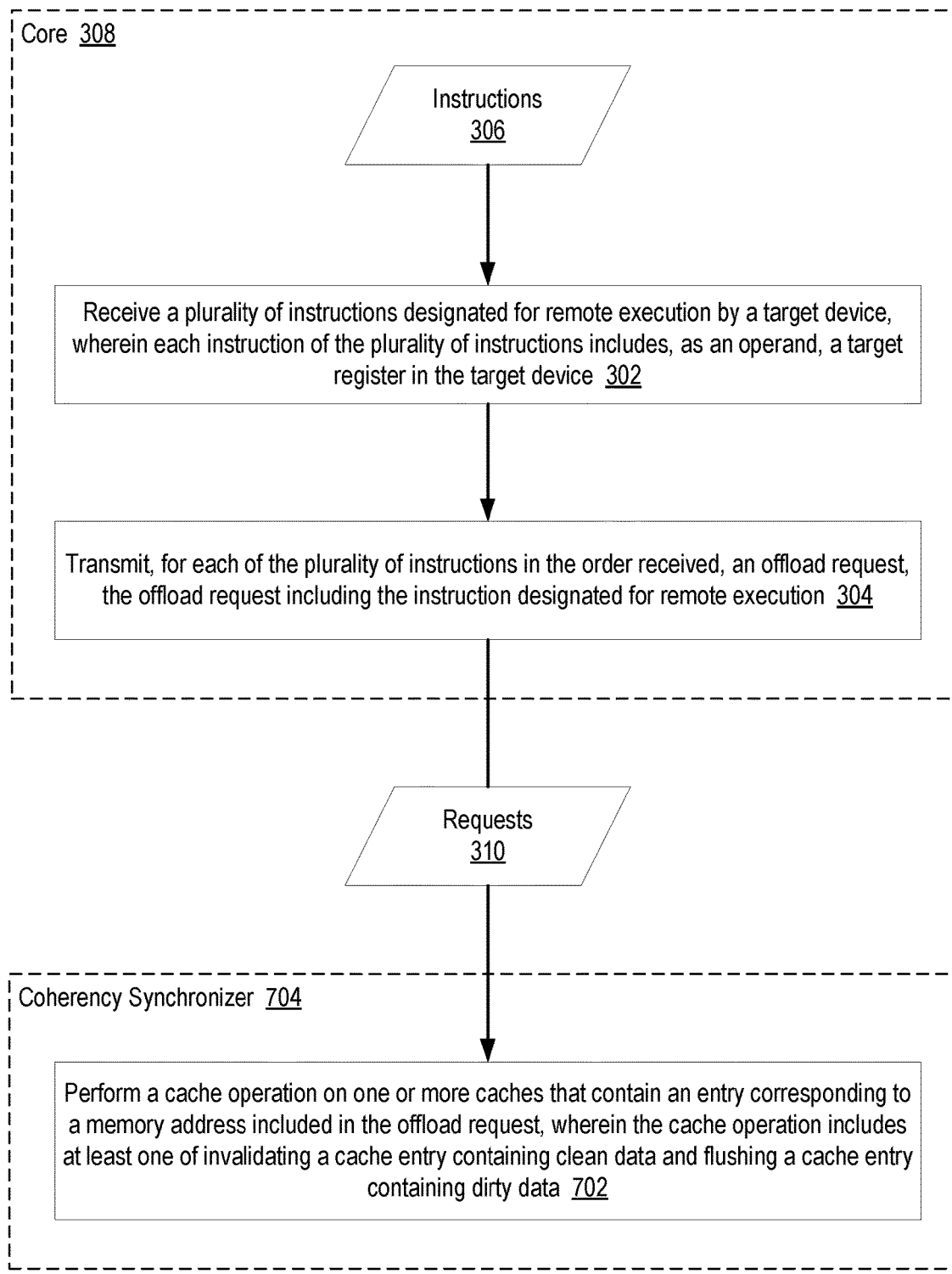
FIG. 7 sets forth a flow chart illustrating another example method of processor-guided execution of offloaded instructions using fixed function operations in accordance with embodiments of the present disclosure.

For further explanation, FIG. 7 sets forth a flow chart illustrating another exemplary method for processor-guided execution of offloaded instructions using fixed function operations according to embodiments of the present disclosure. Like the exemplary method of FIG. 3, the method of FIG. 7 also includes receiving 302 a plurality of instructions 306 designated for remote execution by a target device, wherein each instruction of the plurality of instructions 306 includes, as an operand, a target register in the target device and transmitting 304, for each of the plurality of instructions 306 in the order received, an offload request 310, the offload request 310 including the instruction designated for remote execution.

The exemplary method of FIG. 7 also includes performing 702 a cache operation on one or more caches that contain an entry corresponding to a memory address included in the offload request 310, wherein the cache operation includes at least one of invalidating a cache entry containing clean data and flushing a cache entry containing dirty data. In some implementations, performing 702 a cache operation on one or more caches that contain an entry corresponding to a memory address included in the offload request 310, wherein the cache operation includes at least one of invalidating a cache entry containing clean data and flushing a cache entry containing dirty data is carried out by a coherency synchronizer 704 (e.g., the coherency synchronizer 136 in FIG. 1) receiving an offload request, identifying a memory address operand included in the offload request, and transmitting a probe to caches in each core complex coupled to the coherency synchronizer 704.

In some examples, the cache probe invalidates clean data in a cache entry corresponding to a memory address to be read for a remote_load instruction to ensure the remote_load instruction reads the latest copy of during an offload request. In some examples, the cache probe flushes dirty data in a cache entry corresponding to a memory address to be read for a remote_load or remote_op instruction to memory so that the offload target device utilizes the up-to-date data that is stored in the cache entry. In some examples, the cache probe invalidates data in a cache entry corresponding to a memory address to be written or a remote_store instruction so that younger instructions do not read data from the cache that might be altered by the remote_store instruction. Each cache that receives the cache probe sends a probe response back to the coherency synchronizer indicating the appropriate cache operations have completed. When the probe response has been received, the offload request may be forwarded to the memory controller 134 for transmission to the offload target device. The coherency synchronizer 704 may wait until cache operations for all offload requests in an offload transaction have completed (i.e., probe responses for all offload requests have been received) before forwarding the offload requests to the memory controller, or may forward each request sequentially as its probe operations (if any) complete.

In these examples, the cache operations are performed for all offload requests of a given offload transaction. In some implementations, the coherency synchronizer employs a probe filter that indicates that there is no need to flush or invalidate any data from the cores for all offload requests of a given transaction. In such a case, the offload requests are forwarded to the memory controller without waiting for the probe responses to arrive. Otherwise, the offload requests await at the probe filter for the dirty data to be sent to the memory controller before the offload requests are sent to the memory controller. Readers will appreciate that offload requests can enforce coherence via invalidating probes and can proceed with accessing memory without even waiting for the probes to complete, as long as there is no dirty line in the caches to be read by an offload instruction. Readers will also appreciate that, through the coherency synchronizer 704, cache probes may communicated to multiple last level caches in multiple core complexes to enforce coherency across these multiple core complexes, which is advantageous to multithreaded applications.

In some embodiments, each offload request 310 is transmitted to the coherency synchronizer 704 directly. In these embodiments, the coherency synchronizer 704 identifies a memory address operand in the received offload request and transmits a cache probe to each cache in each connected core complex. The cache probe requests that data be invalidated or flushed depending on the opcode included in the offload request (i.e., remote_load, remote_store, remote_op).

Consider an example using FIG. 1 where the core 106 transmits an offload request that is received by the coherency synchronizer 136. The coherency synchronizer 136 identifies a memory address operand in the request and sends a cache probe for the memory address the L3 cache 130 in core complex 102 and the L3 cache 132. The cache probe indicates that clean data in a cache entry corresponding to the memory address should be invalidated or dirty data in a cache entry corresponding to the memory address should be flushed. Cache logic in the L3 cache 130 in the core complex 102 receives the probe request, performs the cache operation if appropriate, and forwards the probe request to the L2 caches 114, 116. Cache logic in the L2 caches 114, 116 receive the probe request, perform the cache operation if appropriate, and forward the probe request to the respective L1 caches 122, 124. Cache logic in the L1 caches 122, 124 receive the probe request and perform the cache operation if appropriate. The L1 caches 122, 124 send a probe response to the L2 caches 114, 116, which send a probe response to the L3 cache 130, which sends a probe response to the coherency synchronizer 136 indicating that all caches in the core complex 102 are in-sync for the offload request 310. The same procedure is carried out in the core complex 104. Once the coherency synchronizer 136 has received a probe response indicating the all caches 120-132 in both core complexes 102, 104 are in-sync for the offload request 310, the offload request is ready for forwarding to the memory controller 134.

In some embodiments, each offload request 310 is transmitted to the coherency synchronizer 704 through each successive cache level for the core 308. In these embodiments, the cache logic in each cache level (L1, L2, L3) of the core 308 identifies the memory operand in the request and performs a cache operation to invalidate or flush data in a cache entry corresponding to the memory address; the L3 cache of the core 308 identifies a memory address operand in the received offload request and transmits a cache probe to each cache of other cores in the core complex. When the coherency synchronizer receives the offload request, the coherency synchronizer 704 identifies the memory address operand in the received offload request and transmits a cache probe to other core complexes. The cache probe requests that data be invalidated or flushed depending on the opcode included in the offload request (i.e., remote_load, remote_store, remote_op).

Consider an example using FIG. 1 where the core 110 transmits an offload request that is received by the L1 cache 126 of the core 110. Cache logic in the L1 cache 126 identifies a memory address operand in the offload request, performs a cache operation to invalidate or flush data in a cache entry corresponding to the memory address, and forwards the offload request to the L2 cache 118 of the core 110. Cache logic in the L2 cache 118 identifies a memory address operand in the offload request, performs a cache operation to invalidate or flush data in a cache entry corresponding to the memory address, and forwards the offload request to the L3 cache 132 of the core 110. Cache logic in the L3 cache 132 in the core complex 104 identifies a memory address operand in the offload request, performs a cache operation to invalidate or flush data in a cache entry corresponding to the memory address, and sends a probe request to the L2 cache 120 of the other core 112 in the core complex 104. Cache logic in the L2 cache 120 receives the probe request, performs the cache operation if appropriate, and forwards the probe request to the L1 cache 128 of core 112. Cache logic in the L1 cache 128 receives the probe request and performs the cache operation if appropriate. The L1 caches 128 sends a probe response to the L2 cache 120, which sends a probe response to the L3 cache 132, which forwards a probe response to the coherency synchronizer 136 indicating that all caches in the core complex 104 are in-sync for the offload request 310.

In this example, when the coherency synchronizer 136 receives the offload request 310, the coherency synchronizer identifies a memory address operand in the request and sends a cache probe for the memory address the L3 cache 130 in core complex 102. The cache probe indicates that clean data in a cache entry corresponding to the memory address should be invalidated and/or dirty data in a cache entry corresponding to the memory address should be flushed. Cache logic in the L3 cache 130 in the core complex 102 receives the probe request, performs the cache operation if appropriate, and forwards the probe request to the L2 caches 114, 116. Cache logic in the L2 caches 114, 116 receive the probe request, perform the cache operation if appropriate, and forward the probe request to the respective L1 caches 122, 124. Cache logic in the L1 caches 122, 124 receive the probe request and perform the cache operation if appropriate. The L1 caches 122, 124 send a probe response to the L2 caches 114, 116, which send a probe response to the L3 cache 130, which sends a probe response to the coherency synchronizer 136 indicating that all caches in the core complex 102 are in-sync for the offload request 310.

In view of the above description, readers will appreciate the embodiments in accordance with the present disclosure provide numerous advantages. In these embodiments a CPU-based ISA with a set of instructions and an architectural register file reserved for remote execution. For example, when coupled to a PIM device, the remote register file is physically located in memory (where the computation dictated by the new instructions and register-held data occurs). The remote registers define data dependencies among remotely executed instructions and dictate register liveness at the remote device where the code will be executed. Embodiments do not require extensive decoder modifications to support ISA extensions for all types of offloaded operations, in that pointers or other metadata indicating the command buffer entry storing the actual operation to be performed by the offload target device may be included in the offload request, such that the CPU core does not need to decode the specific operation that will be performed by the fixed function module in the offload target device. Further, the architecture described here does not require additional structures that track temporal reuse of addresses.

Readers will appreciate that embodiments in accordance with the present disclosure provide an offload transaction as a linear sequence of instructions that is offloaded for remote execution. All remotely executed instructions within an offload transaction are dispatched in program order by the CPU core at retire time and executed in the same program order remotely.

Readers will appreciate that embodiments in accordance with the present disclosure provide a remote execution flow for offload instructions that preserves memory consistency and coherency. The remotely executed instructions operate on cacheable data managed in virtual memory. Cache coherency in the CPU core and other cores and core complexes are enforced through cache probes implemented by a coherency synchronizer.

Readers will appreciate that embodiments in accordance with the present disclosure does not require round-trip communication between the offload target device and the CPU cores. As offload requests are fulfilled by the offload target device after the offload instructions have retired in the CPU core, there is no need for additional communication from the offload target device back to the CPU core.

Readers will appreciate that embodiments in accordance with the present disclosure support CPU pipeline flushes of any type since offload instructions flow through the CPU pipeline just like conventional instructions.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of processor-guided execution of offloaded instructions using fixed function operations, the method comprising:
    receiving one or more instructions designated for remote execution by a target device; and
    transmitting, for each of the one or more instructions, an offload request, the offload request including a pointer to an entry, within a command buffer at the target device, identifying an opcode corresponding to the instruction designated for remote execution.

2. The method of claim 1, wherein each instruction of the one or more instructions includes, as an operand, a target register in the target device; and wherein a processor implements an instruction set architecture extension that identifies the target register as a virtual register.

3. The method of claim 1, wherein each of the one or more instructions includes an opcode from a group of opcodes in an instruction set architecture extension implemented by a processor; and wherein the group of opcodes in the instruction set architecture extension consists of a remote load opcode, a remote computation opcode, and a remote store opcode.

4. The method of claim 1, wherein transmitting, for each of the one or more instructions, an offload request, the offload request including the instruction designated for remote execution includes:
    generating a memory address for an instruction designated for remote execution; and
    coupling the memory address with the offload request.

5. The method of claim 1, wherein transmitting, for each of the one or more instructions, an offload request, the offload request including the instruction designated for remote execution includes:
    obtaining local data for the instruction designated for remote execution; and
    coupling the local data with the offload request.

6. The method of claim 1, wherein transmitting, for each of the one or more instructions, an offload request, the offload request including the instruction designated for remote execution includes:
    buffering the offload requests until after an oldest instruction in the one or more instructions has retired; and
    transmitting, for each of the one or more instructions in an order received, an offload request.

7. The method of claim 1 further comprising performing a cache operation on one or more caches that contain an entry corresponding to a memory address included in the offload request, wherein the cache operation includes at least one of invalidating a cache entry containing clean data and flushing a cache entry containing dirty data.

8. The method of claim 7, wherein the cache operation is performed on a plurality of caches that contain an entry corresponding to a memory address included in the offload request, and wherein the plurality of caches are distributed across a plurality of core clusters each including a plurality of processor cores.

9. The method of claim 1, wherein the target device is a processing-in-memory device.

10. The method of claim 1, wherein the target device is an accelerator coupled to a memory device, and wherein the entry is one of a plurality of entries included within the command buffer that identifies a plurality of opcodes.

11. A multicore processor comprising:
    two or more processor cores;
    at least one cache shared by the two or more processor cores; and
    at least one memory controller configured for communication with a target device
    wherein the two or more processor cores are configured to:
    receive one or more instructions designated for remote execution by the target device; and
    transmit, for each of the one or more instructions, an offload request, the offload request including a pointer to an entry, within a command buffer at the target device, identifying an opcode corresponding to the instruction designated for remote execution.

12. The processor of claim 11, wherein each instruction of the one or more instructions includes, as an operand, a target register in the target device; and wherein the processor implements an instruction set architecture extension that identifies the target register as a virtual register.

13. The processor of claim 11, wherein each of the one or more instructions includes an opcode from a group of opcodes in an instruction set architecture extension implemented by the processor; and wherein the group of opcodes in the instruction set architecture extension consists of a remote load opcode, a remote computation opcode, and a remote store opcode.

14. The processor of claim 11, wherein transmitting, for each of the one or more instructions, an offload request, the offload request including the instruction designated for remote execution includes:
    buffering the offload requests until after an oldest instruction in the one or more instructions has retired; and
    transmitting, for each of the one or more instructions in an order received, an offload request.

15. The processor of claim 11, wherein the two or more processor cores are further configured to perform a cache operation on one or more caches that contain an entry corresponding to a memory address included in the offload request, wherein the cache operation includes at least one of invalidating a cache entry containing clean data and flushing a cache entry containing dirty data.

16. A system comprising:
    a processing-in-memory (PIM) device; and
    a multicore processor coupled to the PIM device, the processor configured to:
    receive one or more instructions designated for remote execution by the PIM device; and
    transmit, for each of the one or more instructions, an offload request, the offload request including a pointer to an entry, within a command buffer of the PIM device, identifying an opcode corresponding to the instruction designated for remote execution.

17. The system of claim 16, wherein each instruction of the one or more instructions includes, as an operand, a target register in the PIM device; and wherein the processor implements an instruction set architecture extension that identifies the target register as a virtual register.

18. The system of claim 16, wherein each of the one or more instructions includes an opcode from a group of opcodes in an instruction set architecture extension implemented by the processor; and wherein the group of opcodes in the instruction set architecture extension consists of a remote load opcode, a remote computation opcode, and a remote store opcode.

19. The system of claim 16, wherein transmitting, for each of the one or more instructions, an offload request, the offload request including the instruction designated for remote execution includes:
   buffering the offload requests until after an oldest instruction in the one or more instructions has retired; and
   transmitting, for each of the one or more instructions in an order received, an offload request.

20. The system of claim 16, wherein the processor is further configured to perform a cache operation on one or more caches that contain an entry corresponding to a memory address included in the offload request, wherein the cache operation includes at least one of invalidating a cache entry containing clean data and flushing a cache entry containing dirty data.

* * * * *